(12) United States Patent
Huber

(10) Patent No.: US 8,401,748 B2
(45) Date of Patent: Mar. 19, 2013

(54) METHOD AND DEVICE FOR INFLUENCING THE TRACTION FORCE DURING SHIFTING OPERATIONS OF A MANUAL TRANSMISSION IN VEHICLES

(75) Inventor: Thomas Huber, Daisbach (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 12/733,642

(22) PCT Filed: Sep. 10, 2008

(86) PCT No.: PCT/EP2008/061973
§ 371 (c)(1),
(2), (4) Date: Jul. 19, 2010

(87) PCT Pub. No.: WO2009/037158
PCT Pub. Date: Mar. 26, 2009

(65) Prior Publication Data
US 2010/0280720 A1    Nov. 4, 2010

(30) Foreign Application Priority Data
Sep. 14, 2007 (DE) ................... 10 2007 044 005

(51) Int. Cl.
| B60L 9/00 | (2006.01) |
| G06F 7/00 | (2006.01) |
| B60T 7/12 | (2006.01) |
| B60T 8/24 | (2006.01) |
| B60K 6/20 | (2007.10) |
| B60K 17/354 | (2006.01) |
| F01B 23/00 | (2006.01) |
| F16D 13/04 | (2006.01) |
| F16D 11/04 | (2006.01) |
| F16D 13/60 | (2006.01) |

(52) U.S. Cl. ............. 701/51; 701/22; 701/80; 701/88; 701/95; 180/65.21; 180/247; 180/336; 903/902; 91/55; 192/32; 192/66.1; 192/69.4; 192/108; 439/76.1; 439/660

(58) Field of Classification Search ............. 701/22, 701/51, 80, 84, 87, 88, 95; 180/65.21, 247, 180/336; 903/902; 91/55; 192/30, 66.1, 192/69.4, 108
See application file for complete search history.

(56) References Cited

U.S. PATENT DOCUMENTS

| 5,699,871 A * | 12/1997 | Hara et al. ................ 180/247 |
| 6,154,700 A * | 11/2000 | Jones ........................ 701/51 |
| 6,319,168 B1 | 11/2001 | Morris et al. |
| 6,595,338 B2 * | 7/2003 | Bansbach et al. ........ 192/85.24 |
| 6,951,151 B2 * | 10/2005 | Ryu ........................ 74/473.34 |
| 7,192,376 B2 * | 3/2007 | Ishii et al. ................ 475/231 |

(Continued)

FOREIGN PATENT DOCUMENTS

| DE | 35 42 059 | 6/1987 |
| DE | 199 19 454 | 11/2000 |

(Continued)

Primary Examiner — James Trammell
Assistant Examiner — Majdi Alsomiri
(74) Attorney, Agent, or Firm — Kenyon & Kenyon LLP

(57) ABSTRACT

In a method for influencing the traction force during shifting operations of a manual transmission in vehicles having at least two drive axles, the drive system of the first axle is activated in such a way that the interruptions in traction force occurring at the second axle during shifting operations of the manual transmission are at least partially compensated for.

8 Claims, 2 Drawing Sheets

U.S. PATENT DOCUMENTS

| | | |
|---|---|---|
| 2001/0003109 A1 | 6/2001 | Tabata |
| 2002/0055411 A1 | 5/2002 | Yoshiaki et al. |
| 2006/0289217 A1* | 12/2006 | Schlaf et al. .................. 180/247 |
| 2007/0179007 A1* | 8/2007 | Ishii et al. ..................... 475/231 |
| 2010/0248888 A1* | 9/2010 | Hamperl et al. .............. 475/221 |

FOREIGN PATENT DOCUMENTS

| | | |
|---|---|---|
| EP | 1 327 547 | 7/2003 |
| EP | 1 393 959 | 3/2004 |
| JP | 2002-142303 | 5/2002 |

* cited by examiner

METHOD AND DEVICE FOR INFLUENCING THE TRACTION FORCE DURING SHIFTING OPERATIONS OF A MANUAL TRANSMISSION IN VEHICLES

BACKGROUND OF THE INVENTION

1. Field of the Invention

The present invention is directed to a method and a device for influencing the traction force during shifting operations of a manual transmission in vehicles.

2. Description of Related Art

Many vehicles are equipped with two axles, only one of which is usually driven. This axle is often connected to an internal combustion engine via a manual transmission and a clutch. Manual transmissions frequently have the characteristic that they must be shifted without load. For this purpose, the internal combustion engine is disconnected from the remainder of the drive train by disengaging the clutch. No traction force can be transmitted via the clutch as long as it is disengaged. As a result, an interruption in the traction force occurs during shifting operations for a manual transmission. Due to the equation $F=m*a$, the traction force is a direct measure of the occurring vehicle acceleration. A drop in traction force is therefore also always a drop in the vehicle acceleration. A sudden drop or increase in the vehicle acceleration is perceived as a jerk by an occupant of a vehicle. A hybrid motor vehicle drive is known from German patent document DE 3542059 C1 in which the two wheels of a drive axle are driven by an internal combustion engine via a transmission having a variable transmission ratio, and the vehicle wheels on a different drive axle may be driven by one or more electric machines.

BRIEF SUMMARY OF THE INVENTION

The present invention is directed to a method and a device for influencing the traction force during shifting operations of a manual transmission in vehicles. The essence of the present invention is that the comfort during shifting may be increased in vehicles having drive systems which act on different axles. This is achieved by at least partially compensating for the interruption in traction force which occurs during a shifting operation when a drive system is disconnected from the drive axle by disengaging the clutch. For this purpose, by use of the device according to the present invention a drive system on a further axle is activated in such a way that the interruption in traction force is at least partially compensated for. The acting traction force usually has different values before and after the shifting operation. When a shift is made to a higher gear, the traction force directly before the shifting operation is higher than directly after the shifting operation, since the transmission ratio is smaller in the higher gear. When a shift is made to a lower gear, the traction force after shifting is correspondingly higher than before shifting. The particular value of the traction force before and after shifting is referred to below as the "traction force level."

Thus, by use of the device according to the present invention not only is the interruption in traction force at least partially compensated for, but also a transition from the traction force level before shifting to the traction force level after shifting is implemented.

Advantageous refinements of and improvements on the device described in the independent claim are possible using the measures stated in the dependent claims.

The gradient of the traction force during the shifting operations may advantageously be predefined. Thus, for example, the driver's input, for example for a torque requested for acceleration of the vehicle via the gas pedal, may be directly implemented.

A further advantageous embodiment of the present invention provides for carrying out the activation in the sense of a higher vehicle acceleration. For example, the duration of the acceleration until reaching the maximum speed may thus be minimized.

A further advantageous embodiment of the present invention provides that the drop and subsequent increase in the vehicle acceleration caused by the interruption in traction force, and in particular the associated perceivable jerk, during shifting operations is minimized by minimizing the slope of the traction force gradient between the two traction force levels.

In a particularly advantageous manner the gradient of the traction force during the shifting operation is controlled in such a way that limiting values for modifying the vehicle acceleration are not exceeded.

A further advantageous embodiment of the present invention provides that the traction force varies according to the driver's input, even during the shifting operations. Thus, for example, the vehicle acceleration may be controlled according to the driver's input even during the shifting operation.

In reality, the torques on the drive system which are necessary for setting the traction force levels before and after the shifting operation are set with a certain time delay, for example because of dead time in the drive systems. Therefore, in a further advantageous embodiment of the present invention it is provided that the activation of the clutch after a shifting request is accordingly delayed so that disconnection of the corresponding torques, or a switch of the torques acting on the two drive axles, is ensured to the greatest extent possible without a drop or increase in the vehicle acceleration, and in particular without the associated perceivable jerk.

DETAILED DESCRIPTION OF THE INVENTION

Figure 1:
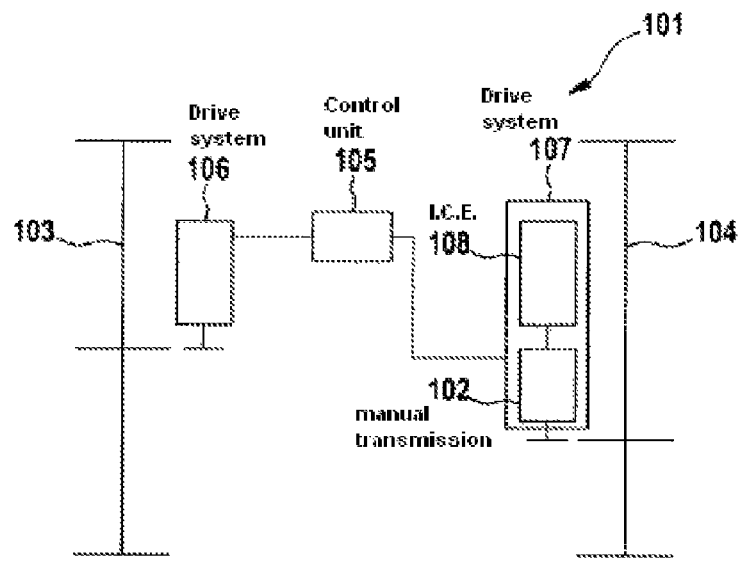
FIG. 1 shows a device for influencing the traction force during shifting operations of a manual transmission in vehicles.

FIG. 1 shows a device 105 for influencing the traction force during shifting operations of a manual transmission 102 in vehicles 101. Two drive axles 103, 104 are provided for the vehicle. Drive system 106 is provided for drive axle 103. In this specific embodiment drive system 106 is designed as an electric machine. Drive system 107 is provided for drive axle 104. In this specific embodiment this drive system is composed of an internal combustion engine 108 and manual transmission 102. Control unit 105 is electronically connected to each of drive systems 106 and 107, thus enabling bidirectional data and signal transmission.

Figure 2:
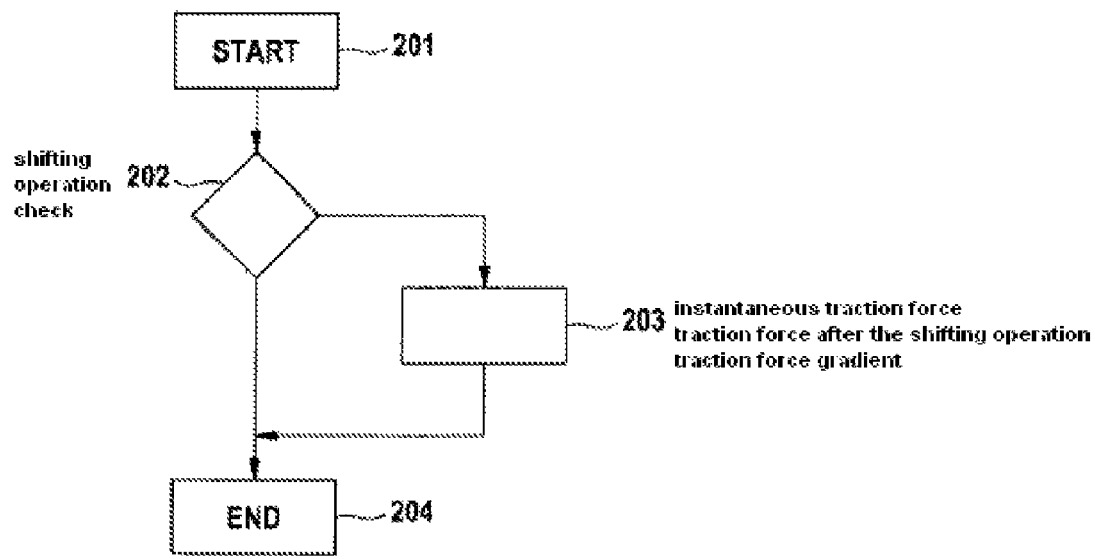
FIG. 2 shows a method for at least partially compensating for interruption in the traction force during shifting operations in vehicles.

FIG. 2 shows a method for at least partially compensating for interruptions in traction force during shifting operations in vehicles. In method step 202 a check is made as to whether a shifting operation should be carried out. If no shifting operation is to be carried out, the method ends with method step 204. If a shifting operation is to be carried out, the method branches to method step 203. In method step 203
- the instantaneous traction force is determined,
- the traction force after the shifting operation is computed, and
- a traction force gradient is computed for the transition from the instantaneous traction force to the traction force after the shifting operation.

During the shifting operation a further drive is activated in such a way that this drive compensates for the interruption in traction force caused by the shifting operation, according to the computed traction force gradient. After the shifting operation is completed the method ends with method step 204. The referenced steps may be cyclically repeated and processed.

Figure 3:
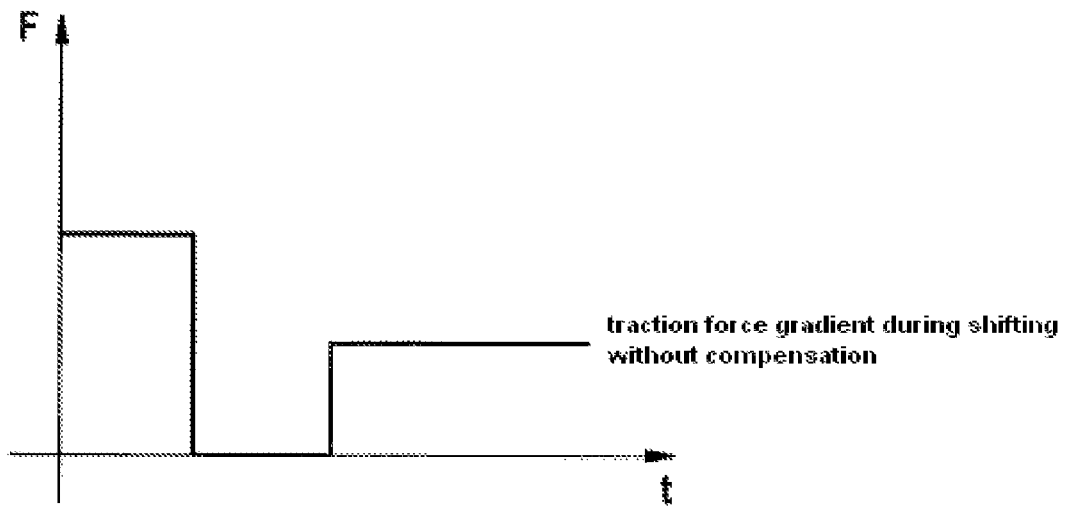
FIG. 3 shows a traction force gradient during shifting, without compensation.

FIG. 3 shows the traction force gradient during a shifting operation, without compensation. The traction force is plotted over time in the illustration. Before the shifting operation begins the traction force is at a high level. During the shifting operation the drive system is disconnected from the drive axle via a clutch, thus preventing transmission of traction force. After the shifting operation is completed the clutch is re-engaged, and once again a traction force acts corresponding to the instantaneous torque and the transmission ratio.

In the description below the terms have the following meanings:
- $M\_prim$: active torque, primary drive
- $M\_sec$: active torque, secondary drive
- $i\_prim\_old$: effective transmission ratio before shifting
- $i\_prim\_new$: effective transmission ratio after shifting
- $i\_sec$: effective transmission ratio, secondary drive
- $F$: resulting traction force The following applies in general for the traction force:
$$F = M\_prim * i\_prim + M\_sec * i\_sec.$$

During shiftings the clutch is disengaged, and it is not possible to transmit traction force via the primary drive. In this case the following applies:
$$F = M\_sec * i\_sec.$$

The effective torques are determined by the driver's input. In the simplest case the traction force is applied only by the primary drive, and the secondary drive makes no contribution. Likewise, the driver's input is assumed to be constant, and therefore the primary drive torque in the time period for shifting is also assumed to be constant. The change in transmission ratio as a result of the shifting causes a deviation in the traction force before and after shifting.

Situation before shifting:
$$F\_old = M\_prim * i\_prim\_old$$
Situation after shifting:
$$F\_new = M\_prim * i\_prim\_new$$
Situation during shifting:
$$F\_shift = M\_sec * i\_sec$$

Traction force F shift may be influenced during shifting by suitable selection of the torque of secondary drive M_sec. For complete compensation of traction force F_old during shifting, this results in
$$F\_shift = F\_old \text{ and thus } M\_sec = M\_prim * i\_prim\_old/i\_sec.$$

If time period t_shift for the shifting is known, secondary drive M_sec may also be selected in such a way that the most linear transition possible between F_old and F_new is achieved. The following expression is then valid:
$$F\_shift(t) = F\_old + t*(F\_new - F\_old)/t\_shift.$$

From this expression M_sec may in turn be computed:
$$M\_sec(t) = M\_prim*(i\_prim\_old + t/t\_shift*(i\_prim\_new - i\_prim\_old))/i\_sec.$$

Figure 4:
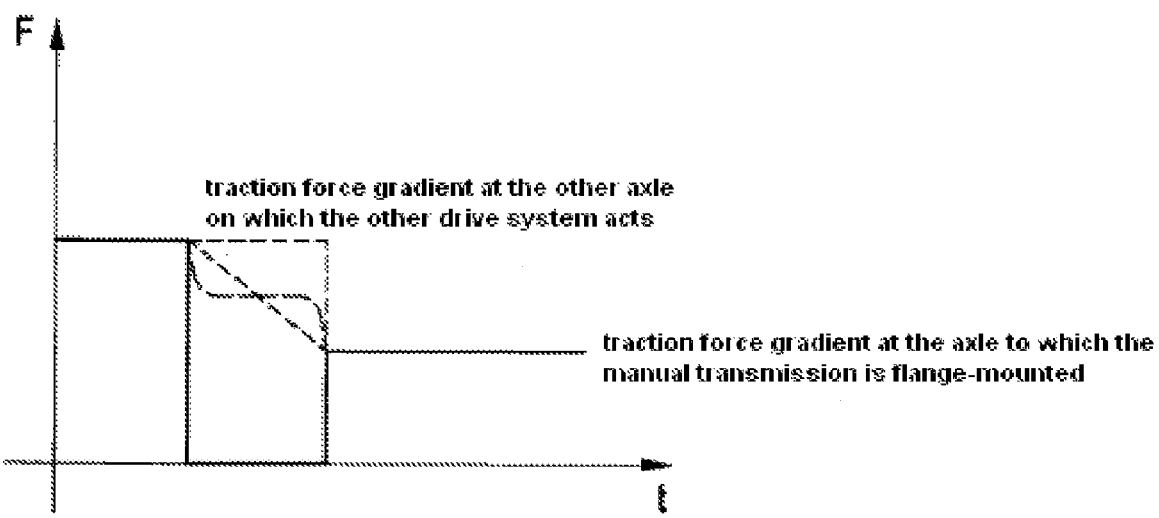
FIG. 4 shows a traction force gradient during shifting, with compensation.

FIG. 4 shows a traction force gradient during a shifting operation, with compensation. The traction force is plotted over time in the illustration. The solid line represents the traction force gradient at the axle to which the manual transmission is flange-mounted. During the shifting operation it is not possible for traction force to be transmitted to this axle. The gradient is comparable to that from FIG. 3. The dash-dotted line represents the traction force gradient at the other axle on which the other drive system acts. Thus, the traction force is at least partially compensated for during the shifting operation. The transition of the traction force from the high level before the shifting operation to the low level after the shifting operation is achieved by activating the second drive system. Depending on the activation of the second drive system, it is possible to implement a discontinuous, linear, or also a freely selectable transition.

What is claimed is:

1. A device for influencing the traction force of a vehicle having at least two axles during a shifting operation of a manual transmission in the vehicle, comprising:
a control unit configured to activate a drive system for a first axle of the vehicle during the shifting operation in such a way that an interruption in traction force occurring at a second axle of the vehicle during the shifting operation of the manual transmission is at least partially compensated,
wherein the compensation is based on a determined traction force gradient, the compensation includes:
determining an instantaneous traction force;
determining a traction force after the shifting operation; and
determining the traction force gradient for the transition from the instantaneous traction force to the traction force after the shifting operation.

2. The device as recited in claim 1, wherein the control unit is configured to activate the drive system of the first axle during the shifting operation in such a way that the traction force gradient during the shifting operation occurs in a pre-defined manner.

3. The device as recited in claim 2, wherein the control unit is configured to activate the drive system of the first axle during the shifting operation to produce a high traction force.

4. The device as recited in claim 2, wherein the drive system of the first axle is activated during the shifting operation to produce a low degree of variation in the traction force.

5. The device as recited in claim 2, wherein the traction force gradient during the shifting operation occurs in such a way that at least one limiting value for modifying the traction force is not exceeded.

6. The device as recited in claim 2, wherein the traction force gradient occurs as a function of a driver's input detected during the shifting operation.

7. The device as recited in claim 1, wherein the control unit is configured to delay an activation of a clutch in response to a shifting request so that a switch of torques acting on the two drive axles is maximized without substantial variation in the traction force.

8. A method for at least partially compensating for an interruption in traction force of a vehicle having at least two axles during a shifting operation of a manual transmission in the vehicle, comprising:

activating a drive system for a first axle of the vehicle during the shifting operation in such a way that an interruption in traction force occurring at a second axle of the vehicle during the shifting operation of the manual transmission is at least partially compensated, wherein the compensation is based on a determined traction force gradient, the compensation includes:
  determining an instantaneous traction force;
  determining a traction force after the shifting operation; and
  determining the traction force gradient for the transition from the instantaneous traction force to the traction force after the shifting operation.

* * * * *

UNITED STATES PATENT AND TRADEMARK OFFICE
CERTIFICATE OF CORRECTION

PATENT NO. : 8,401,748 B2  Page 1 of 1
APPLICATION NO. : 12/733642
DATED : March 19, 2013
INVENTOR(S) : Thomas Huber It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
First Day of September, 2015

Michelle K. Lee
*Director of the United States Patent and Trademark Office*